United States Patent
Emejulu et al.

(10) Patent No.: US 11,227,262 B2
(45) Date of Patent: Jan. 18, 2022

(54) TECHNIQUES FOR IMPROVING THE ABILITY OF AN INVITEE TO FULLY PARTICIPATE IN A MEETING VIA A DATA PROCESSING SYSTEM

(71) Applicant: INTERNATIONAL BUSINESS MACHINES CORPORATION, Armonk, NY (US)

(72) Inventors: Nnaemeka I. Emejulu, Austin, TX (US); Andrew J. Lavery, Austin, TX (US); Mario A. Maldari, Longmont, CO (US); Karthikeyan Ramamoorthy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 14/921,504

(22) Filed: Oct. 23, 2015

(65) Prior Publication Data
US 2017/0116579 A1 Apr. 27, 2017

(51) Int. Cl.
*G06Q 10/10* (2012.01)
*H04L 12/18* (2006.01)

(52) U.S. Cl.
CPC ...... *G06Q 10/1095* (2013.01); *H04L 12/1818* (2013.01)

(58) Field of Classification Search
CPC .............. G06Q 10/1095; H04L 12/1818
USPC ........................................ 705/7.19
See application file for complete search history.

(56) References Cited

U.S. PATENT DOCUMENTS

| 5,276,869 A | 1/1994 | Forrest et al. |
|---|---|---|
| 6,434,571 B1 | 8/2002 | Nolte |
| 8,126,922 B2 | 2/2012 | Holzapfel et al. |
| 8,239,236 B2 | 8/2012 | Mansour |
| 9,026,590 B2 | 5/2015 | Michel et al. |
| 2007/0150477 A1 | 6/2007 | Barsness et al. |
| 2008/0133282 A1 | 6/2008 | Landar et al. |
| 2011/0154204 A1* | 6/2011 | Narayanaswamy .... H04M 3/56 715/727 |
| 2012/0005278 A1* | 1/2012 | Muller ............... G06Q 10/1095 709/206 |
| 2014/0344032 A1 | 11/2014 | Shahine et al. |
| 2015/0304369 A1* | 10/2015 | Sandholm .............. G06Q 10/10 715/753 |

OTHER PUBLICATIONS

Zoho Meeting Open to Public, Business Wire (Jun. 19, 2007) (Year: 2007).*

* cited by examiner

*Primary Examiner* — Charles Guiliano
(74) *Attorney, Agent, or Firm* — Brian Russell; Jeffrey S. La Baw; Anthony V. S. England (57) ABSTRACT

A technique for improving meeting participation in electronically calendared meetings includes a data processing system receiving an electronic invitation to a virtual meeting that requires access to one or more referenced resources for a meeting invitee to fully participate in the meeting. Whether the invitee has access to the referenced resources is determined by a data processing system. In response to determining that the invitee does not have access to the referenced resources, access for the invitee to the referenced resources is provisioned by a data processing system. Finally, the meeting is added to an electronic calendar associated with the invitee.

14 Claims, 6 Drawing Sheets

Meeting Notices

Open   Remove

| Date  | Sender          | Subject          | Action Required          |
|-------|-----------------|------------------|--------------------------|
| 04/21 | VP of Operations| All hands meeting| Java Plug-in install     |
| 04/08 | Test Council    | Review design    | Install designer plug-in |

FIG. 6

TECHNIQUES FOR IMPROVING THE ABILITY OF AN INVITEE TO FULLY PARTICIPATE IN A MEETING VIA A DATA PROCESSING SYSTEM

BACKGROUND

The present disclosure is generally directed to data processing and, more particularly, to techniques for improving the ability of an invitee to fully participate in a meeting via a data processing system.

In general, calendaring software provides users of data processing systems with an electronic version of a calendar showing dates and days of the week. Calendaring software may, for example, also provide an appointment book and an address book or contact list that includes a list of contacts with information to enable a user to communicate with the contacts. Such tools are an extension of many of the features provided by time management software. Calendaring software may take the form of a local package designed for individual use or may take the form of a networked package that allows for sharing information between different users.

When implemented as a networked package, calendaring software may support various collaborative features including, for example: appointment attachments that allow users to attach a file to an appointment; an appointment calendar that provides a list of appointments and attendees for the appointments; appointment reminders that automatically remind participants of an upcoming meeting; availability sharing that allows users to share their availability with others; calendar publishing that allows a user to publish select calendar information on a public link; collaborative scheduling that facilitates checking schedules and proposing meeting times to potential meeting participants; an email system that is tied into the appointment calendar to send reminders and notify participants of issues arising with scheduled meetings; and a web-based interface that allows users to access their calendars from any computer or mobile device without having to solely rely on a work or personal computer.

U.S. Pat. No. 8,239,236 (hereinafter "the '236 patent") addresses the problem of trying to find a good time for a potential meeting participant that is frequently busy. The '236 patent discloses allowing a potential meeting participant to pick a meeting time that works for them. U.S. Pat. No. 5,276,869 (hereinafter "the '869 patent") discloses identifying a technical code of a document and an audience for the document. According to the '869 patent, the document is then sent to the audience (i.e., a select group) to review the document and sign-off on the document. U.S. Patent Application Publication No. 2008/0133282 discloses providing automatic tools and visual hints to a meeting host who is scheduling a meeting to book meeting related resources more efficiently by utilizing provided profile information and additional metadata from meeting confirmations.

BRIEF SUMMARY

Disclosed are a method, a data processing system, and a computer program product (embodied in a computer-readable storage device) for improving the ability of an invitee to fully participate in a meeting via a data processing system.

A technique for improving meeting participation in electronically calendared meetings includes receiving, at a data processing system, an electronic invitation to a meeting that requires access to one or more referenced resources for a meeting invitee to fully participate in the meeting. Whether the invitee has access to the referenced resources is determined by the data processing system. In response to the data processing system determining that the invitee does not have access to the referenced resources, access for the invitee to the referenced resources is provisioned by the processing system. Finally, the meeting is added to an electronic calendar associated with the invitee.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product (embodied in a computer-readable storage device) for improving the ability of an invitee to fully participate in a meeting.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the term 'meeting' refers to a conference where all conference participants may not be at a same location and share and exchange information via electronic communication channels (e.g., via computer and telephone).

When an electronic calendar invitation for a future meeting or online presentation is received, an invitee may accept the meeting without opening the invitation until a later point in time, e.g., on the day of the meeting. A typical electronic meeting invitation may include one or more uniform resource locators (URLs) or hyperlinks that facilitate access to referenced resources (e.g., a Wiki page, a confidential document in a team room, and/or source code stored in a source code management system (e.g., Rational Team Concert™)). Before an invitee can access referenced resources, authentication and authorization of the invitee may be required. Assuming an invitee does not open a meeting invitation until just prior to an associated meeting, the invitee may have to scramble to secure access to the referenced resources in order to fully participate in meeting discussions. For example, an invitee may attempt to open a hyperlink only to find that the invitee does not have required permissions and/or required software (e.g., a correct version of a Java™ plug-in) installed and, as such, cause a delay in the meeting while the invitee downloads and installs the required software or obtains the necessary permissions.

According to one embodiment of the present disclosure, a data processing system performs a pre-processing evaluation of meeting content (e.g., included in an email message) before an electronic calendar invitation is sent to invitees. In this embodiment, URLs in the calendar invitation are evaluated by the data processing system in an attempt to ensure that the URLs are valid before the invitation is electronically transmitted to invitees that are expected to participate in a meeting. According to another aspect of the present disclosure, a data processing system determines whether additional authentication and authorization is required for any of the invitees to fully participate in the meeting. For example, a data processing system may electronically transmit an access request to a resource owner requesting that the resource owner grant access (e.g., temporary or permanent access) to referenced resources that invitees need to access during a meeting. According to one or more aspects of the present disclosure, a telephone number and/or participant code that are to be utilized for an audio portion of a meeting may also be verified to be valid and active prior to the meeting, to avoid meeting delays attributable to invalid telephone numbers and/or invalid participant codes.

As one example, a centralized authentication service may be implemented on a data processing system that accesses permissions of invitees in a "To" field of an invitation email and compares materials and/or hyperlinks referenced in the email to ensure the invitees are authorized to access the materials and/or hyperlinks referenced in the email. It should be appreciated that permissions of invitees included in an invitee (participant) list for a meeting may be confidential, such that in a conventional corporate environment only a human manager or administrator other than the meeting facilitator would have access to the permission information to prevent the information from being exposed (which may result in a security or privacy breach). In such a case, the meeting facilitator may not be allowed to directly access and/or modify the permission information and therefore may not be able to provide invitees access to the referenced resources.

According to another embodiment, a data processing system (machine) utilized by an invitee may be configured to ensure that the invitee has access to resources referenced in an email prior to a meeting. In the event input is required from any invitee, subsequent to the invitee accepting an invitation, one or more prompts may be provided to the invitee to complete a workflow required for the invitee to gain access to referenced resources. As noted above, a meeting invitee may also receive an electronic invitation whose referenced resources require specific software (e.g., third-party software) be installed on a data processing system associated with the meeting invitee in order for the invitee to access the referenced resources. In this case, one or more actions may be required for the invitee to access the resources (to be prepared for the meeting) and those actions may also be provided by the data processing system to the invitee. For example, an invitee 'to do' list may be generated as a widget window in an email application associated with the invitee.

Validation may be performed by a data processing system associated with a meeting facilitator (sender), regarding who has permissions to access referenced resources in an invitation. Alternatively or additionally, validation may be performed by a data processing system associated with an invitee (recipient) for any actions required on the part of the invitee. According to at least one embodiment, when a meeting facilitator wants to schedule a meeting the meeting facilitator adds invitees (participants) to an invitation list of an electronic meeting invitation. For example, the electronic meeting invitation may include: URL links; attachments; and other related materials. An access request for required documents and/or data sources needed for a meeting may be initiated in a number of ways. For example, when a meeting facilitator selects a send button in an email application, a list of invitees (recipients) in a 'To' list may be cross-referenced to referenced resources in the electronic meeting invitation at a central access repository. The meeting facilitator may then be electronically notified which invitees have access to what referenced resources (assuming the meeting facilitator is allowed access to such information). The meeting facilitator may then request access (e.g., permanent access or limited access that expires after the meeting) to the resource(s) for an invitee. To facilitate glitch-free meetings, additional validation beyond participants' access to referenced resources may be employed. For example, validation may include determining whether URLs are broken, conference call telephone numbers and participant codes are valid, and/or whether attachments are invalid (e.g., 0-byte) attachments. In various embodiments, a meeting facilitator may be alerted to any meeting-related issues in, for example, a user interface (UI) presentation.

As another example, when an invitee receives an electronic meeting invitation, a data processing system of the invitee may be configured to automatically check the invitation for prerequisite software requirements (e.g., a correct version of a Java plug-in, a correct version of Microsoft Office™, a correct version of Lotus Notes™, etc.). An invitee may then be advised by the data processing system (in a widget or other UI) as to what is required in order to satisfy invitation requirements. It should be appreciated that an invitee may then choose to address 'to dos'. Various disclosed embodiments advantageously pre-validate access to referenced resources (e.g., hyperlinks) in the context of an electronic meeting invitation that is sent and/or received. Disclosed embodiments also address software validation (e.g., software version validation) in the context of a meeting participant. In general, the disclosed techniques are superior to approaches in which a meeting facilitator collects snapshots and send them to all meeting participants, as a meeting facilitator may not be aware of all corporate requirements and/or access levels currently available to each meeting participant. While the disclosure focuses on URLs as the referenced resources that are checked, the disclosed techniques can be readily applied to verification of virtually any other electronically verifiable resource, e.g., source code repositories such as Rational Team Concert, Lotus Notes Team rooms, Wiki pages, attached or remote files (including virus checking of such files), and/or blogs.

Figure 1:
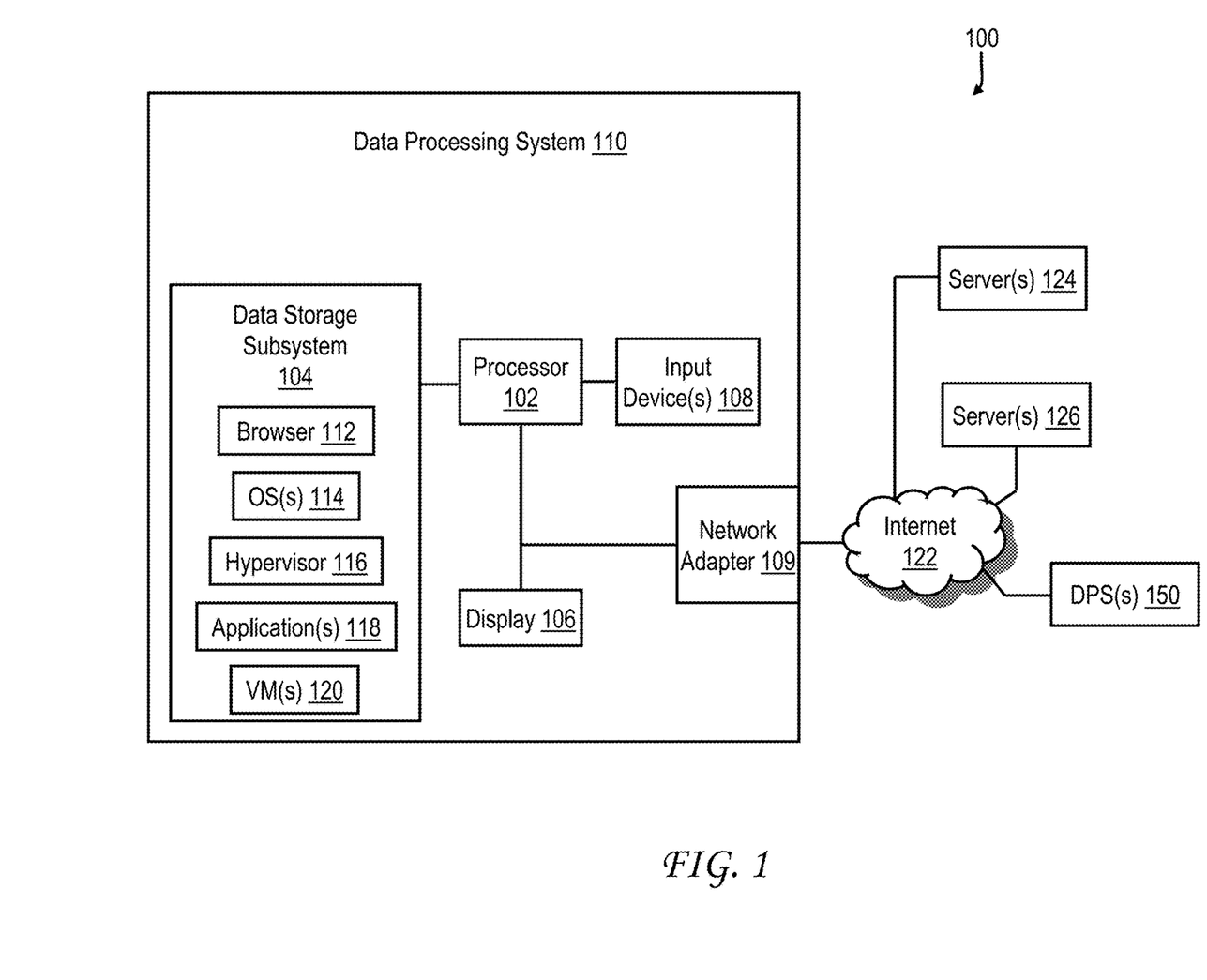
FIG. 1 is a diagram of a relevant portion of an exemplary data processing system environment that includes a data processing system that is configured to implement calendaring software according to the present disclosure.

With reference to FIG. 1, an exemplary data processing environment 100 is illustrated that includes a data processing system (DPS) 110 that is configured, according to one or more embodiments of the present disclosure, to improve the ability of an invitee to fully participate in a meeting. Data processing system 110 may take various forms, such as workstations, laptop computer systems, notebook computer systems, desktop computer systems, tablets, mobile phones, servers and/or clusters thereof. Data processing system 110 includes one or more processors 102 (which may be chip multiprocessors (CMPs) that include one or more processor cores for executing program code, with each processor core having an associated L1 cache) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), flash memory, and read-only memory (ROM)), and/or one or more mass storage devices, such as flash memory, magnetic, or optical disk drives. For example, data storage subsystem 104 may include L2 and L3 cache and main memory.

Data storage subsystem 104 includes one or more operating systems (OSs) 114 for data processing system 110. Data storage subsystem 104 also includes application programs, such as a browser 112 (which may optionally include customized plug-ins to support various client applications), a hypervisor (or virtual machine monitor (VMM)) 116 for managing one or more virtual machines (VMs) as instantiated by different OS images, and other applications (e.g., a word processing application, a presentation application, and an email application) 118. In general, a calendaring function may be incorporated within another application, such as an email application, or may be provided by a stand-alone application.

Display 106 may be, for example, a cathode ray tube (CRT) or a liquid crystal display (LCD). Input device(s) 108 of data processing system 110 may include, for example, a mouse, a keyboard, haptic devices, stylus, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
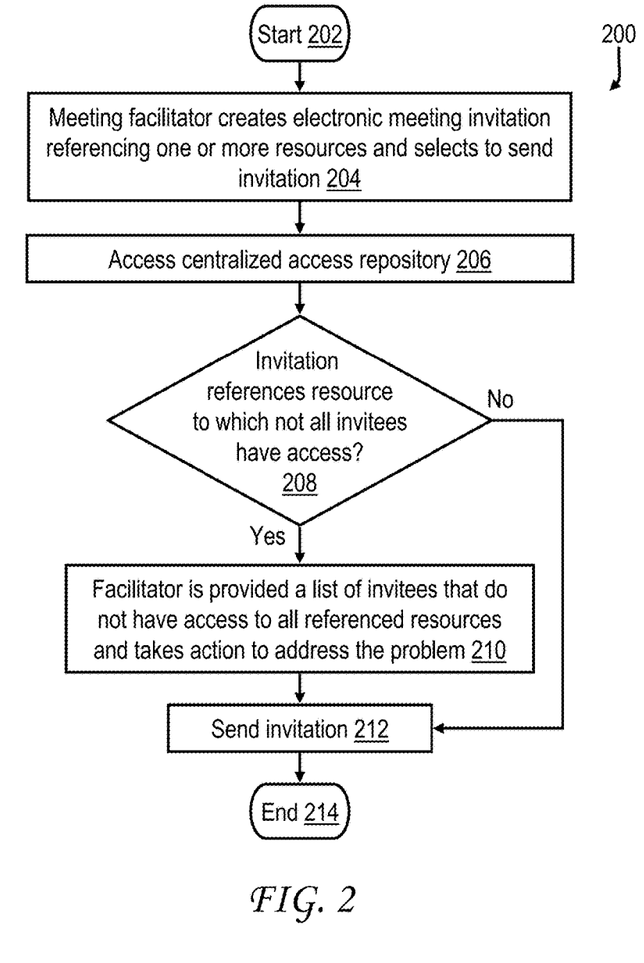
FIG. 2 is a flowchart of an exemplary process that executes on a data processing system associated with a meeting facilitator, according to one embodiment of the present disclosure.

With reference to FIG. 2, a process 200 is illustrated that executes on a data processing system associated with a meeting facilitator in one embodiment. For example, process 200 may execute on DPS 150. In block 202 process 200 is initiated by DPS 150, e.g., in response to a meeting facilitator initiating the creation of an electronic meeting invitation. Next, in block 204, the meeting facilitator creates, using DPS 150, an electronic meeting invitation for one or more invitees that includes or references one or more resources (e.g., uniform resource locators (URLs) to resources and/or attachments) and selects to electronically send the electronic meeting invitation to the invitees. Then, in block 206, DPS 150 accesses a centralized access repository (e.g., located on server 124). Next, in decision block 208, DPS 150 determines whether the electronic meeting invitation includes or references one or more resources to which not all invitees have access by examining entries associated with the invitees and/or resources in the centralized access repository. In response to determining at block 208 that the meeting invitation does not include or reference a resource to which not all invitees have access, control transfers to block 212. In block 212 DPS 150 electronically sends the electronic meeting invitation to the invitees (which may entail transmitting the electronic meeting invitation to an centralized server that in turn distributes the electronic meeting invitation to data processing systems 110 associated with the invitee(s)). From block 212 control transfers to block 214 where process 200 terminates.

In response to determining at block 208 that the electronic meeting invitation includes or references at least one resource to which not all invitees have access, control transfers to block 210. In block 210, DPS 150 provides (to the meeting facilitator) a list of invitees that do not have access to all resources for the meeting. The meeting facilitator then takes action to address the problem. For example, the meeting facilitator may contact (e.g., via email or by telephone) an individual that is responsible for providing access to a referenced resource to request access for one or more meeting invitees. In at least one embodiment, DPS 150 automatically initiates this workflow, for example, by presenting and auto-populating the address and text of a message (e.g., email message) to a human individual or automated computer-based access control service having authority to grant access to a resource. Following block 210 control transfers to block 212.

Figure 3:
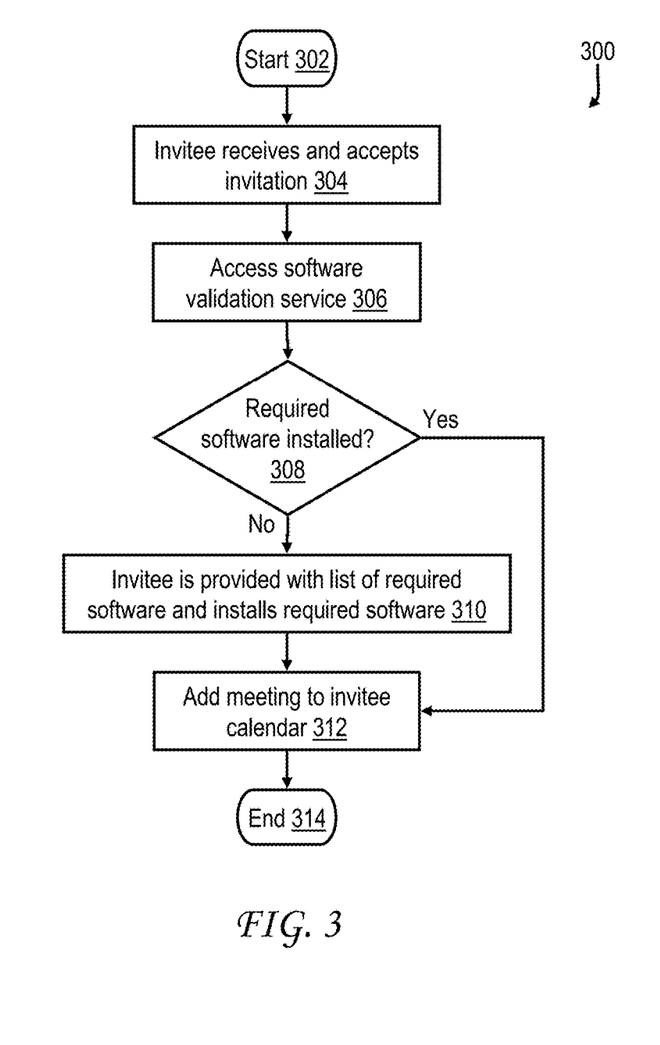
FIG. 3 is a flowchart of an exemplary process that executes on a data processing system associated with a meeting invitee, according to one embodiment of the present disclosure.

With reference to FIG. 3, process 300 is illustrated that executes on a data processing system associated with a meeting invitee in one embodiment. For example, process 300 may execute on DPS 110. In block 302 process 300 is initiated by DPS 110, e.g., in response to the meeting invitee selecting a send/receive button in an associated email application. Next, in block 304, the invitee receives and accepts an electronic meeting invitation, for example, via the email application that executes on DPS 110. Then, in block 306, DPS 110 automatically accesses a software validation service (e.g., located on server 124). Next, in decision block 308, DPS 110 determines by reference to the software validation service whether or not the software required to participate in the electronic meeting is installed on DPS 110.

In response to DPS 110 determining at block 308 that the required software is already installed on DPS 110, control transfers to block 312. In block 312 DPS 110 adds the meeting to an electronic calendar of the invitee (e.g., maintained by the email application). From block 312 control transfers to block 314 where process 300 terminates. In response to DPS 110 determining at block 308 that all of the required software is not already installed on DPS 110, control transfers to block 310. In block 310 DPS 110 provides the invitee with a list of required software, which the invitee may elect to install on DPS 110 (e.g., by selecting an "OK" or "Install" button in a UI window). From block 310 control transfers to block 312 where, as discussed above, DPS 110 adds the meeting to an electronic calendar of the invitee.

Figure 4:
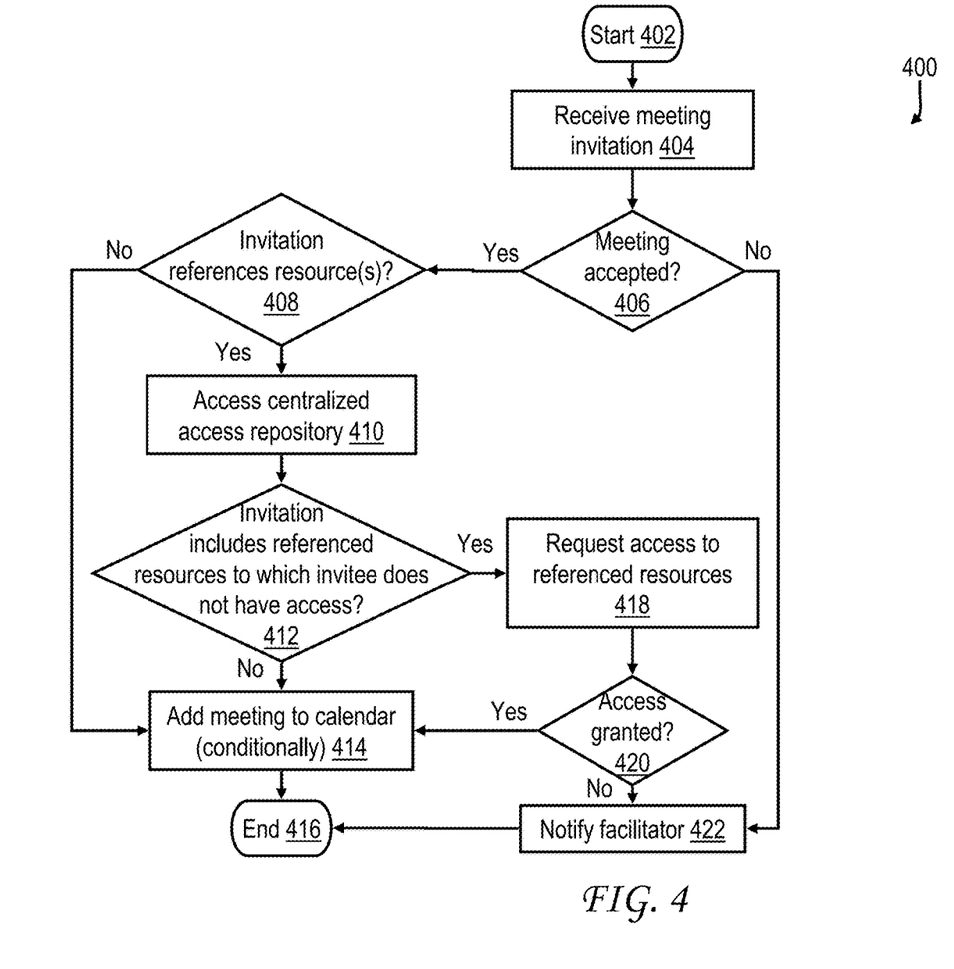
FIG. 4 is a flowchart of an exemplary process that executes on a data processing system associated with a meeting invitee, according to yet another embodiment of the present disclosure.

With reference to FIG. 4, a process 400 that executes on a data processing system associated with a meeting invitee in another embodiment is illustrated. For example, process 400 may execute on DPS 110. In block 402 process 400 is initiated by DPS 110, e.g., in response to the meeting invitee selecting a send/receive button in an associated email application that executes on DPS 110. Next, in block 404, the invitee receives an electronic meeting invitation via the email application. Then, in decision block 406, DPS 110 determines whether the meeting invitation was accepted by the invitee (e.g., via entry of an input in the UI of the email application). In response to the meeting invitation not being accepted by the invitee in block 406, control transfers to block 422. In block 422 DPS 110 sends an electronic message to a data processing system associated with the meeting facilitator (e.g., via an email server) to notify the meeting facilitator that the meeting invitee has not accepted the meeting invitation. From block 422 control transfers to block 416, where process 400 terminates.

In response to the meeting invitation being accepted by the invitee in block 406, control transfers to decision block 408. In block 408 DPS 110 determines whether the electronic meeting invitation includes or references one or more resources. In response to DPS 110 determining at block 408 that the electronic meeting invitation does not include or reference one or more resources, control transfers to block 414, where DPS 110 adds the meeting to an electronic calendar of the invitee (e.g., maintained by an email application). From block 414 control transfers to block 416. In response to DPS 110 determining at block 408 that the electronic meeting invitation does include or reference one or more resources, control transfers to block 410, where DPS 110 accesses a centralized access repository (e.g., located on server 124). Next, in decision block 412, DPS 110 determines whether the electronic meeting invitation includes or references at least one resource to which the invitee does not have access by examining entries associated with the invitee and/or resources in the centralized access repository. In response to a determination at block 412 that the electronic meeting invitation does not include or reference a resource to which the invitee does not have access, control transfers to block 414. In response to the meeting invitation including or referencing at least one resource to which the invitee does not have access in block 412, control transfers to block 418.

In block 418 DPS 110 automatically issues an electronic request for access (e.g., from a centralized access service executing on server 124) to the referenced resources to which the invitee does not have access that are required for the meeting. Next, in decision block 420, DPS 110 determines whether a response is received from the centralized access service granting the invitee access to the referenced resources. In response to access being granted in block 420 control transfers to block 414. In response to access not being granted in block 420 control transfers to block 422, where an electronic notification (e.g., email message) is sent to a data processing system associated with the meeting facilitator to inform the meeting facilitator that the invitee does not have access to all resources referenced in the meeting invitation. From block 422 control transfers to block 416.

Figure 5:
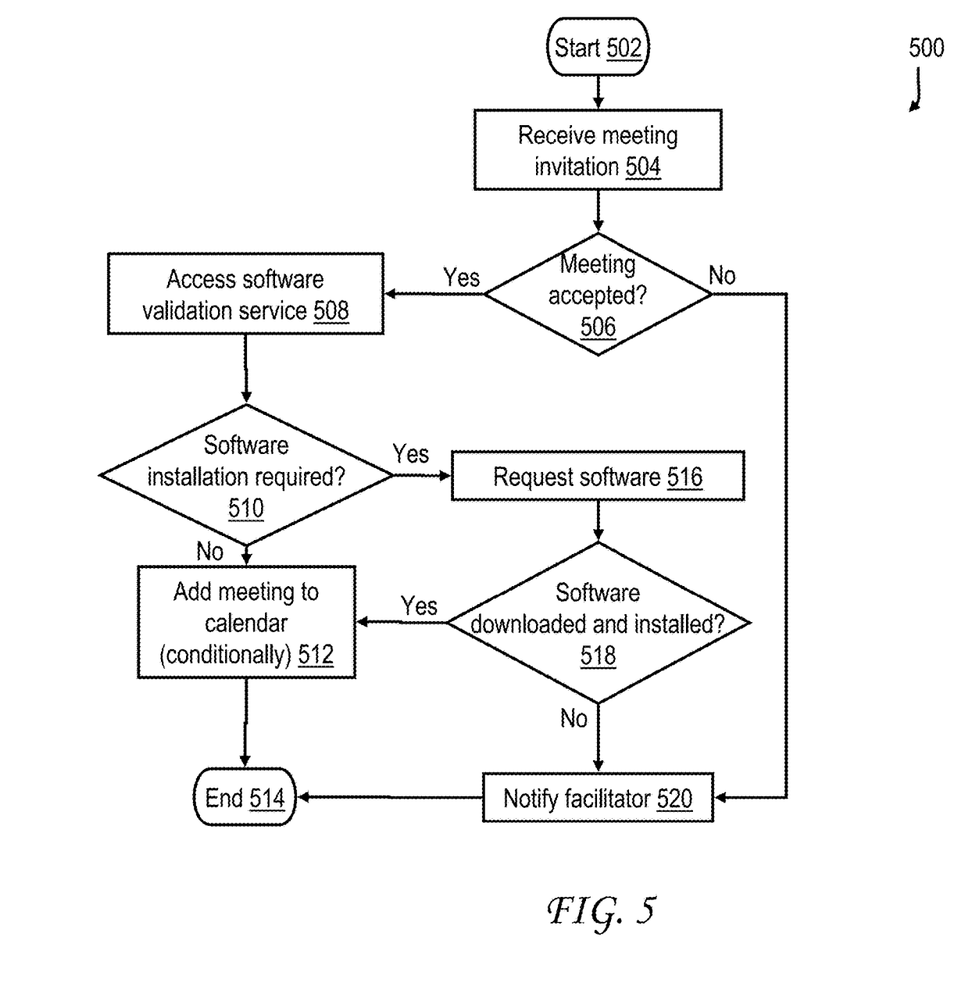
FIG. 5 is a flowchart of an exemplary process that executes on a data processing system associated with a meeting invitee, according to still another embodiment of the present disclosure.

With reference to FIG. 5, a process 500 that executes on a data processing system associated with a meeting invitee in yet another embodiment is illustrated. For example, process 500 may execute on DPS 110. In block 502 process 500 is initiated by DPS 110, e.g., in response to the meeting invitee selecting a send/receive button in an associated email application executed by DPS 110. Next, in block 504, the invitee receives an electronic meeting invitation via the email application. Then, in decision block 506, DPS 110 determines whether the meeting invitation was accepted by the invitee, for example, by providing an input to a UI of the email application. In response to the meeting invitation not being accepted by the invitee in block 506 control transfers to block 520. In block 520 DPS 110 sends an electronic message (e.g., email message) to a data processing system associated with the meeting facilitator to notify the meeting facilitator that the meeting invitee has not accepted the meeting invitation. From block 520 control transfers to block 514 where process 500 terminates.

In response to the meeting invitation being accepted by the invitee in block 506 control transfers to block 508. In block 508 DPS 110 accesses a software validation service (e.g., located on server 124), which determines whether software required for the meeting is installed on DPS 110. As one example, a meeting facilitator can provide a list of required software for the meeting to the software validation service. As another example, the software validation service may determine a list of required software for the meeting by examining content of the meeting invitation and determining what software is installed on a machine associated with the meeting invitee (e.g., DPS 110). Next, in block 510, DPS 110 determines whether software installation is required based on input received from the software validation service. In response to no software installation being required, control transfers from block 510 to block 512, where DPS 110 adds the meeting to an electronic calendar of the invitee. From block 512 control transfers to block 514, where process 500 terminates. In response to software installation being required in block 510, control transfers to block 516, where DPS 110 requests required software from a centralized software repository (e.g., located on server 124). Next, in decision block 518, DPS 110 determines whether the required software has been downloaded and installed. In response to the required software being downloaded and installed in block 518, control transfers to block 512. In response to the required software not being downloaded and installed in block 518, control transfers to block 520, where an electronic notification (e.g., email message) is sent to a data processing system associated with the meeting facilitator to inform the meeting facilitator that all of the software required for the meeting is not available for download and installation by at least one invitee. From block 520 control transfers to block 514.

Figure 6:
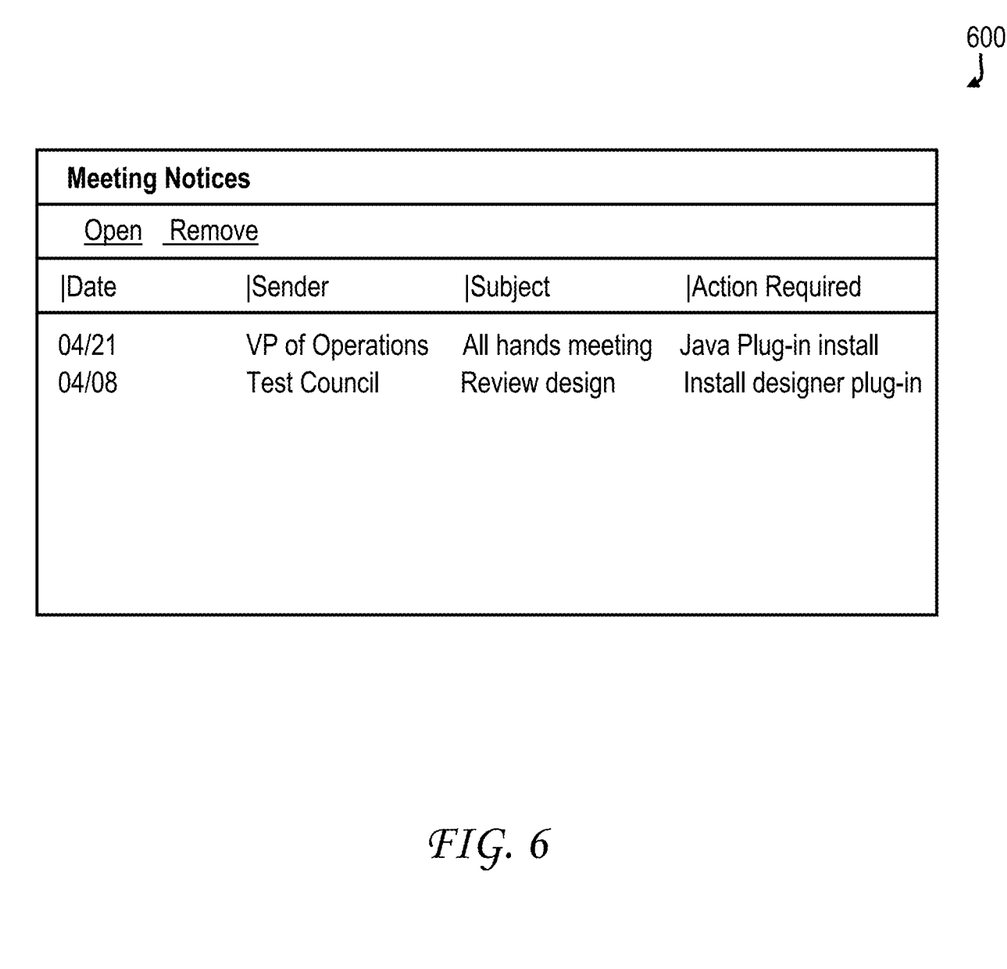
FIG. 6 depicts an exemplary notice that is provided to a meeting invitee, according to one embodiment of the present disclosure.

With reference to FIG. 6, an exemplary meeting notices screenshot 600 is illustrated that may be provided to a meeting invitee by an application (e.g., email application) executing on DPS 110. It should be appreciated that screenshot 600 lists actions that are required on the part of the invitee in order to be prepared for scheduled meetings. As is shown, an 'all hands meeting' scheduled for '04/21' by the 'VP of Operations' requires a Java plug-in be installed on a data processing system associated with the invitee. As is also shown, a 'review design meeting' scheduled for '04/08' by the 'Test Council' requires a designer plug-in be installed on the data processing system associated with the invitee. While screenshot 600 lists software that is required for scheduled meetings, it should be appreciated that a screenshot may also list resources that are required for scheduled meetings.

Accordingly, techniques have been disclosed herein that advantageously improve the ability of a meeting invitee to fully participate in a meeting by ensuring that the invitee has access to required resources and/or required software. The disclosed techniques may be utilized singly or in combination.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "storage device" is to be construed as including only statutory manufactures and as excluding nonstatutory subject matter, such as transient signals per se, transmission media per se, and forms of energy per se.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of improving meeting participation in electronically calendared meetings, comprising:
   creating, using a data processing system, an electronic invitation to a virtual meeting that requires access to one or more referenced resources for meeting invitees to fully participate in the meeting;
   determining, using the data processing system, whether each of the invitees has access to the referenced resources required for the meeting by accessing a centralized authentication service;
   in response to determining that one or more of the invitees does not have access to the referenced resources required for the meeting, provisioning, using the data processing system, access for the one or more of the invitees to the referenced resources by authenticating and authorizing the one or more of the invitees for the referenced resources with the centralized authentication service, wherein the referenced resources include a uniform resource locator (URL) to a resource that includes one or more of a Wiki page, a confidential document in a team room, and source code stored in a source code management system;
   initiating adding, subsequent to the provisioning and prior to the meeting, using the data processing system, the meeting to an electronic calendar associated with the one or more of the invitees based on the electronic invitation;
   determining prior to the meeting, using the data processing system, whether each of the invitees has access to software required for the invitees to fully participate in the meeting; and
   in response to determining prior to the meeting that at least one of the invitees does not have access to the required software, initiating installing prior to the meeting, using the data processing system, the required software on a machine associated with the at least one of the invitees.

2. The method of claim 1, wherein the electronic calendar is included in an email application.

3. The method of claim 1, further comprising:
   electronically notifying a facilitator of the meeting that the one or more of the invitees lack access to one or more of the referenced resources.

4. The method of claim 1, further comprising:
   electronically notifying the one or more of the invitees that the one or more of the invitees lack required software to fully participate in the meeting.

5. The method of claim 1, further comprising:
   electronically notifying a facilitator of the meeting that the one or more of the invitees lack required software to fully participate in the meeting.

6. A computer program product configured to improve meeting participation in electronically calendared meetings, comprising:
   a computer-readable storage device; and
   computer-readable program code embodied on the computer-readable storage device, wherein the computer-readable program code, when executed by a data processing system, causes the data processing system to:
   create an electronic invitation to a virtual meeting that requires access to one or more referenced resources for meeting invitees to fully participate in the meeting;
   determine whether each of the invitees has access to the referenced resources required for the meeting by accessing a centralized authentication service;

in response to determining that one or more of the invitees does not have access to the referenced resources required for the meeting, provision access for the one or more of the invitees to the referenced resources by authenticating and authorizing the one or more of the invitees for the referenced resources with the centralized authentication service, wherein the referenced resources include a uniform resource locator (URL) to a resource that includes one or more of a Wiki page, a confidential document in a team room, and source code stored in a source code management system;

initiate adding, subsequent to the provisioning and prior to the meeting, the meeting to an electronic calendar associated with the one or more of the invitees based on the electronic invitation;

determine prior to the meeting whether each of the invitees has access to software required for the invitees to fully participate in the meeting; and in response to determining that at least one of the invitees does not have access to the required software prior to the meeting, initiate installing prior to the meeting the required software on a machine associated with the at least one of the invitees.

7. The computer program product of claim 6, wherein the electronic calendar is included in an email application.

8. The computer program product of claim 6, wherein the computer-readable program code, when executed by the data processing system, further causes the data processing system to:
electronically notify a facilitator of the meeting that the one or more invitees lack access to one or more of the referenced resources.

9. The computer program product of claim 6, wherein the computer-readable program code, when executed by the data processing system, further causes the data processing system to:
electronically notify the one or more of the invitees that the one or more of the invitees lack required software to fully participate in the meeting.

10. The computer program product of claim 6, wherein the computer-readable program code, when executed by the data processing system, further causes the data processing system to:
electronically notify a facilitator of the meeting that the one or more of the invitees lack required software to fully participate in the meeting.

11. A data processing system, comprising:
a cache memory; and
a processor coupled to the cache memory, wherein the processor is configured to:
create an electronic invitation to a virtual meeting that requires access to one or more referenced resources for meeting invitees to fully participate in the meeting;
determine whether each of the invitees has access to the referenced resources required for the meeting by accessing a centralized authentication service;
in response to determining that one or more of the invitees does not have access to the referenced resources required for the meeting, provision access for the one or more of the invitees to the referenced resources by authenticating and authorizing the one or more of the invitees for the referenced resources with the centralized authentication service, wherein the referenced resources include a uniform resource locator (URL) to a resource that includes one or more of a Wiki page, a confidential document in a team room, and source code stored in a source code management system;
initiate adding, subsequent to the provisioning and prior to the meeting, the meeting to an electronic calendar associated with the one or more of the invitees based on the electronic invitation;
determine prior to the meeting whether each of the invitees has access to software required for the invitees to fully participate in the meeting; and
in response to determining that at least one of the invitees does not have access to the required software prior to the meeting, initiate installing prior to the meeting the required software on a machine associated with the at least one of the invitees.

12. The data processing system of claim 11, wherein the electronic calendar is included in an email application.

13. The data processing system of claim 11, wherein the processor is further configured to:
electronically notify a facilitator of the meeting that the one or more of the invitees lack access to one or more of the referenced resources.

14. The data processing system of claim 11, wherein the processor is further configured to:
electronically notify the one or more of the invitees that the one or more of the invitees lack required software to fully participate in the meeting.

* * * * *